W. C. HUSS.

COMBINED ARM REST AND GUARD FOR COUNTERS, BARS, &c.

No. 11,414. Reissued Apr. 17, 1894.

Witnesses.
Ralph C. Emyart
Richard N. Osborne.

Inventor.
William C. Huss
By Geo. J. Murray
his attorney

UNITED STATES PATENT OFFICE.

WILLIAM C. HUSS, OF CINCINNATI, OHIO, ASSIGNOR, BY MESNE ASSIGNMENTS, TO THE BRUNSWICK-BALKE COLLENDER COMPANY, OF OHIO.

COMBINED ARM-REST AND GUARD FOR COUNTERS, BARS, &c.

SPECIFICATION forming part of Reissued Letters Patent No. 11,414, dated April 17, 1894.

Original No. 470,002, dated March 1, 1892. Application for reissue filed October 27, 1892. Serial No. 450,189.

*To all whom it may concern:*

Be it known that I, WILLIAM C. HUSS, a citizen of the United States, residing at Cincinnati, in the county of Hamilton and State of Ohio, have invented certain new and useful Improvements in a Combined Arm-Rest and Guard for Counters, Bars, &c.; and I do hereby declare the following to be a full, clear, and exact description of the invention, reference being had to the annexed drawings, which form part of this specification.

The object of my invention is to provide an attachment capable of performing the two-fold duties of a guard that prevents liquors running down the front of a bar, and also to serve as an arm-rest or support for the patrons thereof. Said attachment may be of any desired size, shape, or material; although it usually consists of a strip of wood secured to the top of the bar and projecting forwardly and upwardly therefrom as far as may be necessary to enable its upper edge to act as the arm-rest. Furthermore, this wooden strip is preferably solid from end to end to constitute the fender or guard and is preferably as a matter of finish covered with a sheet-metal or other cap that adds to the ornamental appearance of the bar. The invention, however, is not limited to bars alone, but may be applied with equal advantage to counters, sales-tables, &c., as hereinafter described.

Figure 1:
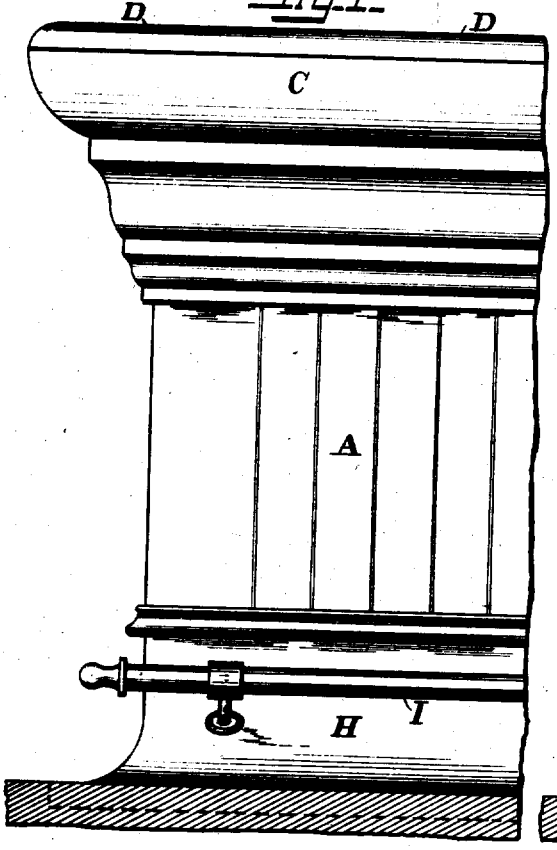
Figure 2:
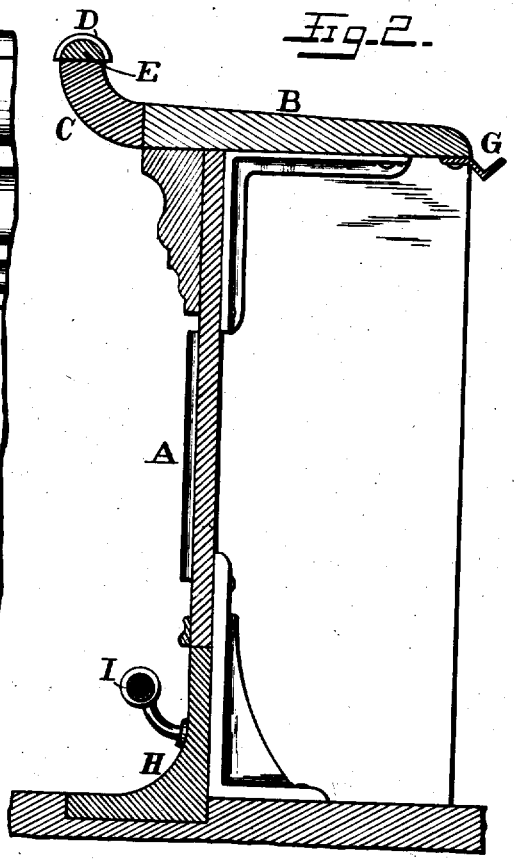
Figure 3:
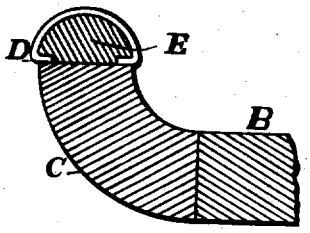
Figure 4:
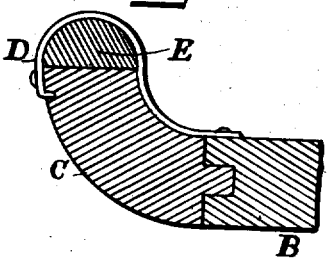

In the annexed drawings, Figure 1 is a front elevation of a portion of a counter or bar provided with the preferred form of my combined arm-rest and guard. Fig. 2. is a vertical section of the same. Fig. 3. is an enlarged vertical section of said rest and guard. Fig. 4. is a similar view of a modification of the invention.

A represents a bar, counter, or sales-table, and B is the top thereof, the front edge of this top having the guard, C, attached thereto. This guard usually consists of a strip of wood bent or worked out to the desired shape and so arranged as to project forwardly and upwardly in order that the upper edge of said guard will be at proper height to serve as a convenient arm-rest. Furthermore, said strip is solid from end to end, to prevent articles falling off or liquids running down over the front of the bar, or counter, and it is preferred to surmount said strip with a sheet-metal cap D, as a matter of finish. In most cases this cap is applied to a rounded rail E, and the latter is glued or otherwise secured to the upper edge of the guard, as more clearly seen in Fig. 3.; but in Fig. 4; the front edge of the cap is secured within a longitudinal groove of the guard C, is then bent over the rail E, and carried down behind said guard, and finally has its rear edge attached to the bar or table top B. This illustration also shows the guard connected to said top by a tongue-and-groove joint.

G in Fig. 2.; is a gutter applied to the rear of the bar, the upper surface of which is inclined, as shown, to lead slops or spilled liquors into said gutter.

H, is a marble or tile base for the counter or bar, and I, is a foot-rail attached thereto.

From the above description it is evident that the application of this guard to a bar prevents liquors running down the front of the same and ruining the varnish and tarnishing the metal ornaments, while the attachment of said guard to an ordinary counter or sales-table renders it impossible for articles to roll therefrom; but whether applied to a bar, counter, or sales-table, the upper edge of the attachment serves as a convenient rest for persons' arms and prevents their sleeves coming in contact with articles on the top B.

I claim as my invention—

1. The combination with a smooth, counter top, of a guard-rail curved upwardly and forwardly from the front edge of said top, and terminating in a round rail; substantially as and for the purposes hereinbefore set forth.

2. The combination with the horizontal bar, or counter, top B, of a combined guard and arm-rest; the said guard extending upwardly from the counter top substantially as and for the purposes hereinbefore set forth.

3. The combination, substantially as hereinbefore set forth, of the counter B; and the guard rail C, curved upwardly and forwardly from the front edge of said top and terminating in a rounded rail E.

4. The combination, substantially as hereinbefore set forth, of the counter A; top B, terminating in an upwardly and forwardly projecting guard and arm-rest C, E; and the gutter G, arranged at the rear edge of the top.

5. The combination, substantially as hereinbefore set forth, of the counter A; the top B, having its outer edge projecting upwardly and forwardly as shown; and the metal finishing-strip D, covering, or partially covering, the outwardly and upwardly projecting front edge of the counter.

6. The combination of a bar, or counter, B, guard C, projecting forwardly and upwardly therefrom and made solid from end to end; a rail E, secured to the upper edge of this guard; and a sheet metal cap D, applied to said rail; all as herein described.

WILLIAM C. HUSS.

Witnesses:
DAVID S. OLIVER,
RICHARD N. OSBORNE.